(12) United States Patent
Wiggins et al.

(10) Patent No.: US 11,626,744 B2
(45) Date of Patent: Apr. 11, 2023

(54) ACTUATING MECHANISM WITH INTEGRAL BATTERY

(71) Applicant: ROTORK CONTROLS LIMITED, Bath (GB)

(72) Inventors: Jonathan Wiggins, Bath (GB); David Ware, Bath (GB); Nian You Tan, Bath (GB)

(73) Assignee: Rotork Controls Limited, Sumerset (GB)

( * ) Notice: Subject to any disclaimer, the term of this patent is extended or adjusted under 35 U.S.C. 154(b) by 399 days.

(21) Appl. No.: 16/762,482

(22) PCT Filed: Oct. 26, 2018

(86) PCT No.: PCT/GB2018/053109
§ 371 (c)(1),
(2) Date: May 7, 2020

(87) PCT Pub. No.: WO2019/092397
PCT Pub. Date: May 16, 2019

(65) Prior Publication Data
US 2021/0194074 A1    Jun. 24, 2021

(30) Foreign Application Priority Data
Nov. 7, 2017   (GB) ..................... 1718371

(51) Int. Cl.
*H02J 7/00* (2006.01)
*H01M 10/44* (2006.01)
(Continued)

(52) U.S. Cl.
CPC ......... *H02J 7/0042* (2013.01); *H01M 10/443* (2013.01); *H01M 10/486* (2013.01);
(Continued)

(58) Field of Classification Search
CPC ....................................................... H02J 7/00
See application file for complete search history.

(56) References Cited

U.S. PATENT DOCUMENTS

| | | |
|---|---|---|
| 2003/0141844 A1 | 7/2003 | Fiebig et al. |
| 2004/0193326 A1 | 9/2004 | Phillips et al. |
| (Continued) | | |

FOREIGN PATENT DOCUMENTS

| | | |
|---|---|---|
| CN | 203880188 U | 10/2014 |
| CN | 204532249 U | 8/2015 |
| (Continued) | | |

OTHER PUBLICATIONS

Russian Office Action dated Mar. 17, 2021 for corresponding Russian Patent Application No. 2020115594/07, English translation, 17 pages.

(Continued)

*Primary Examiner* — Robert Grant
(74) *Attorney, Agent, or Firm* — Polsinelli PC

(57) ABSTRACT

A motor-driven actuator device includes an enclosure (1) in which a motor, control module (3) and a drive (4) are housed. The drive (4) is coupled between a motor and a device being actuated. The device also includes an input for receiving a renewable or harvested energy power supply and a battery pack (6) housed within said enclosure (1). The battery pack (8) is electrically connected to selectively drive the motor and drive system (4) and is electrically connectable to the renewable or harvested energy power supply for charging. The control module is configured to cause the battery pack (6) to selectively drive the motor and cause the actuator to move.

31 Claims, 4 Drawing Sheets

(51) Int. Cl.
  *H01M 10/48* (2006.01)
  *H02J 50/00* (2016.01)
  *H02J 9/06* (2006.01)
(52) U.S. Cl.
  CPC .. *H02J 7/007192* (2020.01); *H02J 7/007194* (2020.01); *H02J 50/00* (2016.02); *H02J 9/06* (2013.01); *H02J 2300/20* (2020.01)

(56) References Cited

U.S. PATENT DOCUMENTS

| | | | |
|---|---|---|---|
| 2009/0101341 A1 | 4/2009 | Willauer | |
| 2009/0211160 A1 | 8/2009 | Tehranchi | |
| 2010/0217443 A1* | 8/2010 | Hagler | F16K 5/0647 700/282 |

FOREIGN PATENT DOCUMENTS

| | | |
|---|---|---|
| CN | 106949289 A | 7/2017 |
| EP | 0923013 A1 | 6/1999 |
| KR | 10-2003-0065381 A | 8/2003 |
| KR | 10-2013-0080283 A | 7/2013 |
| RU | 2158869 C2 | 11/2000 |
| RU | 2465811 C2 | 11/2012 |
| RU | 2559060 C2 | 8/2015 |
| WO | 2010/083058 A1 | 7/2010 |
| WO | 2019/092397 A1 | 5/2019 |

OTHER PUBLICATIONS

GB Search Report for Application No. GB1718371.6, dated May 2, 2018; 2 pgs.
International Search Report and Written Opinion relating to International Application No. PCT/GB2018/053109, dated Jan. 7, 2019; 13 pgs.

* cited by examiner

ACTUATING MECHANISM WITH INTEGRAL BATTERY

CROSS-REFERENCE TO RELATED APPLICATIONS

This application is a U.S. National Stage Application of International Application No. PCT/GB2018/053109, filed Oct. 26, 2018, which claims the benefit of Great Britain Patent Application No. 1718371.6, filed Nov. 7, 2017, the entire contents of which are hereby incorporated by reference in their entirety.

FIELD OF THE INVENTION

This invention relates generally to a motor-driven actuator mechanism, such as a valve actuator, including an integral battery.

BACKGROUND OF HE INVENTION

The power source applied to a motor-driven actuating mechanism, such as a valve actuator, is usually provided by an AC mains supply. However, it is known to provide a (often external) battery backup in such devices to provide valve Shutdown operation by utilising power from a battery source during AC supply mains failure. Thus, in such devices, under normal supply conditions, the actuator operates from the site AC electrical supply. However, in the event that this supply is lost, the actuator automatically switches over to receive power from a battery supply, allowing control of the valve to a (often externally) pre-configured (Shutdown) position.

However, the battery used in such devices is external to the actuator, a passive device and it is of a type that is not generally suitable for use in explosion proof (EP) environments. There is little or no active monitoring or operation of the battery, and it certainly could not be considered suitable to act as the sole power supply for effecting normal operation of the valve actuator.

It is an object of aspects of the present invention to address at least some of these issues.

SUMMARY OF THE INVENTION

In accordance with a first aspect of the present invention, there is provided a motor-driven actuator device comprising an enclosure in which a motor, control module and a drive is housed, said drive being coupled between a motor and said device being actuated, the device further comprising an input for receiving a renewable or harvested energy power supply and a battery pack housed within said enclosure, said battery pack being electrically connected to selectively drive the motor and drive system and being electrically connectable to said renewable or harvested energy power supply for charging, the control module being configured to cause said battery pack to selectively drive said motor and cause said actuator to move.

The renewable or harvested energy power supply may be configured to run the ancillary systems of said device.

In an exemplary embodiment of the invention, the above-mentioned ancillary systems comprise sensors and/or transducers connected by wireless or wired means for monitoring process conditions in respect of said device.

The actuator device may have at least two modes of operation, said first mode of operation comprising a Shutdown mode in which said actuator is caused to move to a predefined position or limit; and, optionally, the control module is configured to monitor a status of said renewable or harvested energy power supply and, if said renewable energy power supply is determined to be disconnected and/or to have failed and/or the battery is discharged to a threshold, cause said actuator to move to said predefined position or limit under power from the battery pack.

The control module may be configured to cause said actuator to move to said predefined position or limit under power from the battery pack in response to receipt of an external shutdown command signal.

The actuator device may comprise a battery actuation mode of operation, wherein the control module is configured to cause said battery pack to be charged by said renewable energy power supply and cause said actuator to be selectively moved under power from said battery pack.

The renewable or harvested energy power supply may comprise a solar, wind and/or hydro energy power supply.

The control module may be configured to monitor a voltage of said battery pack and, in the event that said voltage is determined to be at or below a predetermined cut-off voltage, cause said battery pack to be isolated and prevent further discharge thereof.

The actuator device may comprise a combination of battery actuation and shutdown modes of operation, wherein the control module is configured to cause said battery pack to be charged by said renewable energy power supply and cause said actuator to be selectively moved under power from said battery pack, and to monitor a status of said renewable energy power supply and, if said renewable energy power supply is determined to be disconnected and/or to have failed and/or to have failed and/or the battery is discharged to a threshold, cause, cause said actuator to move to said predefined position or limit under power from the battery pack.

In an exemplary embodiment, the control module may be configured to receive data representative of a status of said renewable energy power supply, receive data representative of a charge state and/or status of said battery pack, and cause said battery pack to be charged from said renewable energy power supply when said renewable energy power supply is determined to be present and said battery pack requires charging. Optionally, the device further comprises at least one temperature sensing device associated with said battery pack, the control module being further configured, during charging of the battery pack, to:

receive, from said at least one temperature sensing device, data representative of a measured temperature associated with said battery pack;

compare said measured temperature with a first predetermined threshold temperature; and if said measured temperature is greater than said first predetermined threshold temperature, cause a charging current delivered from said external power supply to said battery pack to be reduced until said measured temperature is at or below said first predetermined threshold temperature.

The actuator device may further comprise at least one heating device associated with said battery pack, and wherein said control module is further configured, during charging of said battery pack, to compare said measured temperature with a second predetermined threshold temperature and, if said measured temperature is less than said second predetermined threshold temperature, cause said at least one heating device to be switched on until said measured temperature is at or above said second predetermined threshold temperature. Optionally, the control module is configured, during discharge of the battery pack, to:
- receive, from said at least one temperature sensing device, data representative of a measured temperature associated with said battery pack;
- compare said measured temperature with a third predetermined threshold temperature; and
- if said measured temperature is less than the third predetermined threshold temperature, reduce said predetermined cut-off voltage.

In an exemplary embodiment, the battery pack comprises a plurality of Secondary Lithium, Nickel-metal Hydride or Nickel-Cadmium battery cells, and the device may further comprise a balanced charging circuit and a circuit configured to provide over voltage, over current and under voltage protection in respect of said battery cells.

Optionally, the battery pack may comprise a plurality of secondary lithium or nickel metal hydride or nickel cadmium cells arranged and configured for use in Explosion-proof environments.

The control module may be configurable to operate in a plurality of modes, events and actions of operation in addition to a shutdown operation. Optionally, said plurality of modes, events and actions of operation include battery actuation, self-contained mode, mains shutdown, battery shutdown and battery actuation events. In a shutdown mode, the control module is configured to move said actuator to any other mid position and/or any other limit of movement.

In said battery actuation mode, the control module may be configured to cause the renewable or harvested energy supply to operate the ancillary systems of said actuator device, including causing said battery pack to be charged by said renewable or harvested energy supply until it receives a move command and, in response to a said move command, may cause said battery pack to cause said actuator to be moved under power from the battery pack, in the form of a battery actuation event, and said battery pack to be discharged.

In an exemplary embodiment, the control module may be configured to communicate a battery pack charge level, battery pack status and/or faults to a user either visually remotely and/or via a wired or wireless network, optionally in the form of a data log.

The actuator may be configured to selectively communicate with the control module and other devices and actuators by wired or wireless means, adjusting set point and/or moving on commands received over a wired and/or wireless network.

The actuator is, optionally, configured to make process decisions based on received data from sensors and/or transducers and vary its own setpoint accordingly selectively with or without reference to an external control system in a Self Contained Mode.

If the renewable or harvested energy supply, or a supplementary mains supply, is deemed to be disconnected or invalid or a valid shutdown command is received, the actuator may be configured (if it has sufficient charge) to move said actuator from any position to a pre-set position or limit in a Battery Shutdown event either:
- a. On loss of valid power supply
- b. On loss of power supply and valid wired and/or wireless demand
- c. On receipt of a valid demand be this by wired and/or wireless means
- d. Any of a, b. or c. with a pre-set and configurable delay In an exemplary embodiment of the invention, the control module may be configured to trigger a battery shutdown event when it is detected that the battery pack capacity has dropped to a critical level and the renewable or harvested energy supply is not at a sufficient level to maintain or re-charge the battery capacity.

In accordance with an exemplary embodiment of the invention, the device may comprise means to monitor temperature and during charge:
- a. Compare said temperature with two predetermined thresholds (high and low)
- b. If said measured temperature is above the high threshold cause the charge current to be reduced. Charge current is restored to normal level when temperature drops below said high temperature
- c. If said temperature is below the low threshold cause a heating device to be turned on raising and/or maintaining the battery at a temperature allowing optimum charge rates.

The motor-driven actuator device may comprise means to monitor temperature and during discharge:
- a. Compare said temperature with two predetermined thresholds (first low and low)
- b. If said measured temperature is below the first low threshold cause the discharge minimum voltage to be reduced.
- c. If said temperature is below the low threshold cause a heating device to be turned on raising and/or maintaining the battery at a temperature allowing optimum discharge rates.

Optionally, the motor-driven actuator device may be configured to prevent actuator operation in any mode should said battery pack:
- a. Determine a fault condition
- b. If so configured determine that charge level is below that able to allow a shutdown event The motor-driven actuator device may, optionally, comprise means for managing and optimising the source power within the actuator enclosure, and varying the charge rate of the battery pack.

In accordance with another aspect of the present invention, there is provided a battery management module for a motor-driven actuator device comprising an enclosure in which a motor and a drive is housed, said drive being coupled between a motor and said device being actuated, the device further comprising an input for receiving a renewable or harvested energy power supply and a battery pack housed within said enclosure, said battery pack being electrically connected to said renewable energy power supply for charging, the battery management module being configured to cause said battery pack to selectively drive said motor and cause said actuator to move.

The battery management module may comprise at least two modes of operation, said first mode of operation comprising a Shutdown mode in which said actuator is caused to move to a predefined position or limit, and may optionally be configured to monitor a status of said renewable energy power supply and, if said renewable energy power supply is determined to be disconnected and/or to have failed, cause said actuator to move to said predefined position or limit under power from the battery pack.

The battery management module may be configured to cause said actuator to move to said predefined position or limit under power from the battery pack in response to receipt of an external shutdown command signal.

The above-mentioned second mode of operation comprises a normal mode of operation, in which said battery pack is idle and said motor is driven by said renewable energy power supply.

The battery management module may comprise a battery actuation mode of operation, wherein it is configured to cause said battery pack to be charged by said renewable energy power supply and cause said actuator to be selectively moved under power from said battery pack.

In an exemplary embodiment, the battery management module may be configured to receive data representative of a measured battery life and cell impedance of said battery pack and compare with a predefined profile;
 a. During charge compare cell impedance and reduce charge voltage accordingly
 b. During discharge compare cell impedance and cause the discharge voltage limit to be reduced accordingly.

Optionally, the battery management module is configured to protect the cells of the battery pack for either or over voltage, over current or under voltage conditions, isolating said battery pack from the actuator, reporting a fault visually or remotely or over a network and if so configured preventing actuator operation.

In an exemplary embodiment, the battery management module is configured to communicate the status, charge level, and capacity visually and over a wired and/or wireless network to a user.

The control module may be configured to trigger a battery shutdown event when it is detected that the battery pack capacity has dropped to a critical level and the renewable or harvested energy supply is not at a sufficient level to maintain or re-charge the battery capacity.

BRIEF DESCRIPTION OF THE DRAWINGS

Embodiments of the present invention will now be described, by way of examples only, and with reference to the accompanying drawings, in which.

DETAILED DESCRIPTION

Exemplary embodiment of the present invention are more particularly concerned with actuators of the type that find wide application as valve and damper actuators in, for example, the power generation industries, oil and gas flow control, marine applications, water utilities and processing industries. Such valve actuators generally have an output shaft driven by a reversible electric motor through gearing, e.g. worm and wheel gearing, and which can move the output shaft in either direction to open or close a valve connected via a valve stem to the output shaft.

Figure 1:
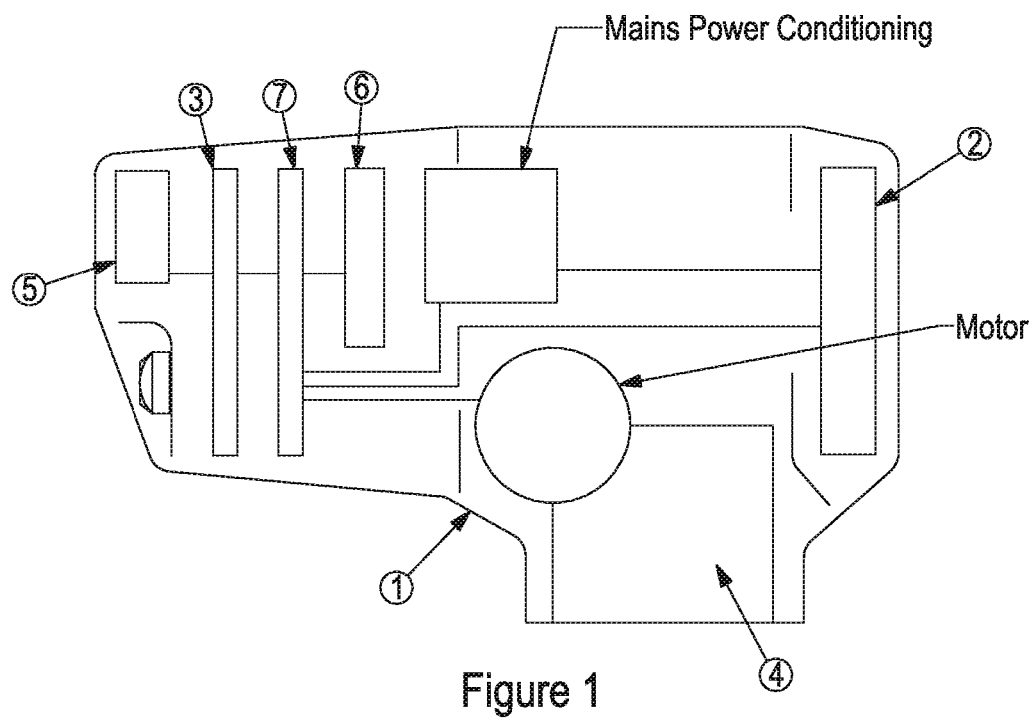
FIG. 1 is a schematic diagram illustrating a valve actuator according to an exemplary embodiment of the present invention.

Referring to FIG. 1 of the drawings, a valve actuator according to an exemplary embodiment of the present invention is illustrated and comprises a main enclosure 1 and a terminal enclosure 2. The enclosures may be hermetically sealed to maintain watertight integrity and protect the internal components therein. The main enclosure houses control modules 3, such as a position control device and load sensor, as well as the drive train 4. A display and local controls 5 may be housed within a cover on the main enclosure.

A battery pack 6 is mounted within the main enclosure and electrically connected to the actuating mechanism, and the actuator further comprises a battery control module 7 for management of the battery pack and operation of the actuating mechanism. The battery pack comprises a plurality of cells, such as Secondary Lithium cells, wired in series with diode protection between the cells. Methods of wiring multiple Secondary Lithium cells to form a battery pack, and wiring configurations therefor, will be known to a person skilled in the art.

The precise number of cells used, and the wiring configuration utilized, will be dependent, to some extent at least, on the capacity and power to be achieved, and also on the space available to house the resultant battery pack, and the present invention is not necessarily intended to be limited in this regard. Secondary Lithium cells are considered advantageous for use in a valve actuator of the type described above as they are suitable for use in Explosion proof (EP) devices. However, the present invention is not strictly intended to be limited in this regard, and other suitable cell types, such as nickel-metal hydride or nickel-cadmium, will be apparent to a person skilled in the art.

In a battery pack of the type described above, it is known to provide a smart balancing charge circuit that, in addition, protects the battery cells from being over-charged, over-discharged or becoming too discharged (also known as over voltage, over current and under voltage protection respectively). Circuits for this purpose are known in other technical fields, and will not be discussed in any further detail herein. Suffice it to say that a person skilled in the art of battery pack design will be sufficiently familiar with electronic balance charging circuits and over voltage, over current and under voltage protection methods, to select and implement a suitable arrangement according to the cell configuration/wiring method used/capacity and power capability required, and specification of the valve actuator.

Secondary battery cells have a limited optimum temperature range, and additional circuitry is provided to protect against over-temperature, together with thermal vents in the cell housing.

Figure 2:
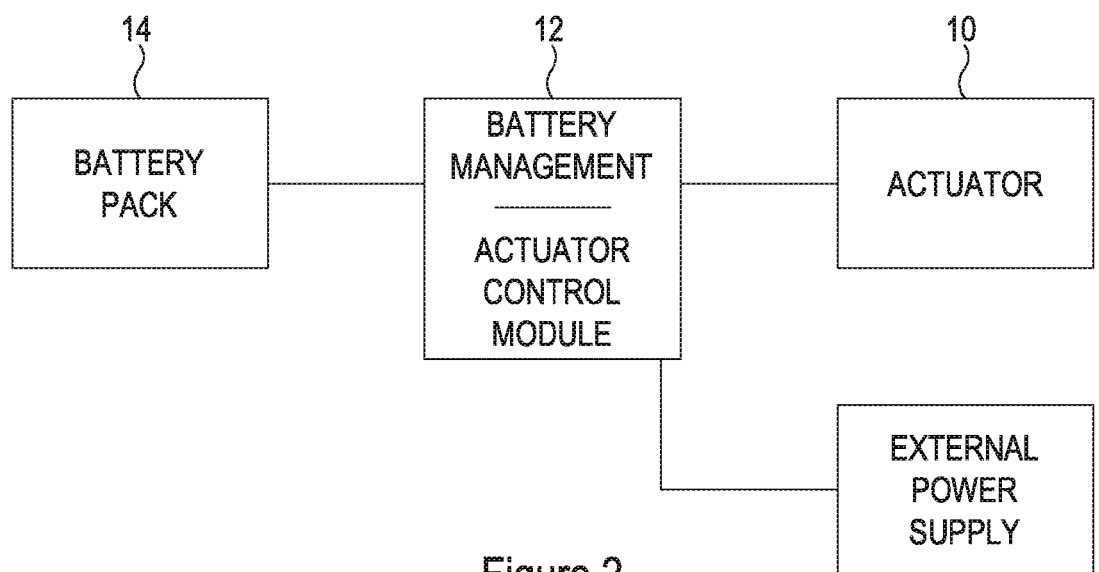
FIG. 2 is a schematic block diagram illustrating the configuration of an actuator, battery pack and actuator control module of a valve actuator according to an exemplary embodiment of the present invention.

Referring to FIG. 2 of the drawings, there is illustrated, in block diagram form, an actuator 10, control module 12 and battery pack 14 configuration according to an exemplary embodiment of the present invention. The control module 12 may incorporate the above-referenced balanced charging and over voltage, over current and under voltage protection functionalities, although this is not essential, and these functions may be provided in a separate module/PCB. In the description that follows, the principal features of the battery management function of an actuator control module according to an exemplary embodiment of the present invention will be described, and it is to be understood that the actuator control module 12 may or may not include other functionality not described in detail herein. Furthermore, the above-referenced principal features are all described as being part of the same actuator control module, but the actuator control module functionality may, of course, be provided in modular form, with one or more of the functions being provided in separate devices/PCBs, and/or remote from other functions, and the present invention is not necessarily intended to be limited in this regard.

The valve actuator exemplary embodiments of the invention, and particularly the battery pack used therein, has three modes of operation: referred to herein as 'Shutdown', 'Battery Actuation' and 'Self-Contained' as well as five events of operation, 'Normal', 'Mains Shutdown', 'Battery shutdown', 'Battery Actuation' and 'Self Contained' and several Resulting action types, each of which are underpinned by the integration of a battery pack of the type described above within a valve actuator and coupled thereto via a battery management function provided as part of an actuator control module. Exemplary embodiments of the invention, all of the above-mentioned modes can be accomplished using the same hardware, using different respective (switchable) configurations. Additional hardware may be used for the 'Self-Contained' mode of operation to transform typically solar energy to electrical energy (in a manner known to a person skilled in the art).

The following is a description of the Battery management system. This exemplary case is within the Shutdown mode with Normal, Mains Shutdown and Battery Shutdown events of operation and Command and Power loss actions as will be describe in more detail further, however many aspects relate to all modes, events and actions of operation.

The control module and associated battery management process flow, provides (in respect of the battery pack) active voltage and current management, diagnostics (located within the valve actuator), status feedback functionality, low temperature management (using heaters to assist performance and maintain the battery cells within their optimum operating temperature range), and high temperature management to extend the operating lifespan of the battery cells. In this exemplary embodiment, the valve actuator (and associated battery pack and control module) would be suitable for use in EP and non-EP environments in temperature ranges from −50° to 70° C.

The battery pack is interrogated by the battery management (or 'actuator control') module to determine battery temperature, battery capacity, battery voltage and level of charge remaining within the battery pack/cells. The present invention is not limited in terms of the manner in which these parameters are determined; the principal utility and advantage of the control module according to this exemplary embodiment of the invention is that it uses these sensed/calculated parameters to manage the battery pack, make decisions and take the best actions for the user, actuator and/or the battery pack based on these parameters, and/or report a battery pack fault based on these parameters within a technical field where this level of battery management has not previously been possible. One of the principal benefits, of course, is that it has not previously been practical to use a battery pack in a valve or damper actuator that complies with EP regulations outside of specific cases. Whereas Secondary Lithium and similar battery cell technologies are able to be utilised in EP (and other) hazardous environment applications, their optimum operating temperature range is limited and they require careful management (especially when charging and discharging). Thus, in accordance with one aspect of the present invention, these issues are addressed. Protection for over temperature is provided, both via electronic means and using thermal vents in the cell housing. The battery pack additionally uses heaters when the ambient temperature drops below a predefined (and configurable) point set by the actuator control module. These measures can, therefore, be utilised to maintain the battery cells at an optimum working temperature for both charging and discharging, and can be selectively switched on and off by the actuator control module when required. At high temperatures, the actuator control module can take the decision as to when to charge the battery pack and the rate at which to charge the battery pack, thereby facilitating extended operating temperature ranges and extending the battery pack life.

Furthermore, over the life of the valve actuator, the battery pack will, inevitably, degrade. The actuator control module may have an inbuilt map of such degradation and, combined with battery capacity sensing, the actuator control module can vary the charge level and voltage to maximise the battery life and performance at different stages in its lifespan. Additionally, there may be an inbuilt map of the battery capacity with temperature which can be used to allow the control module to compensate for differing temperature conditions.

Thus, an actuator control module (incorporating a battery management function) according to an exemplary embodiment of the present invention is communicably coupled to an integral battery and configured to monitor and control the battery operation according to a mode of operation and a plurality of associated respective parameters, as will be described in more detail hereinafter.

Figure 3:
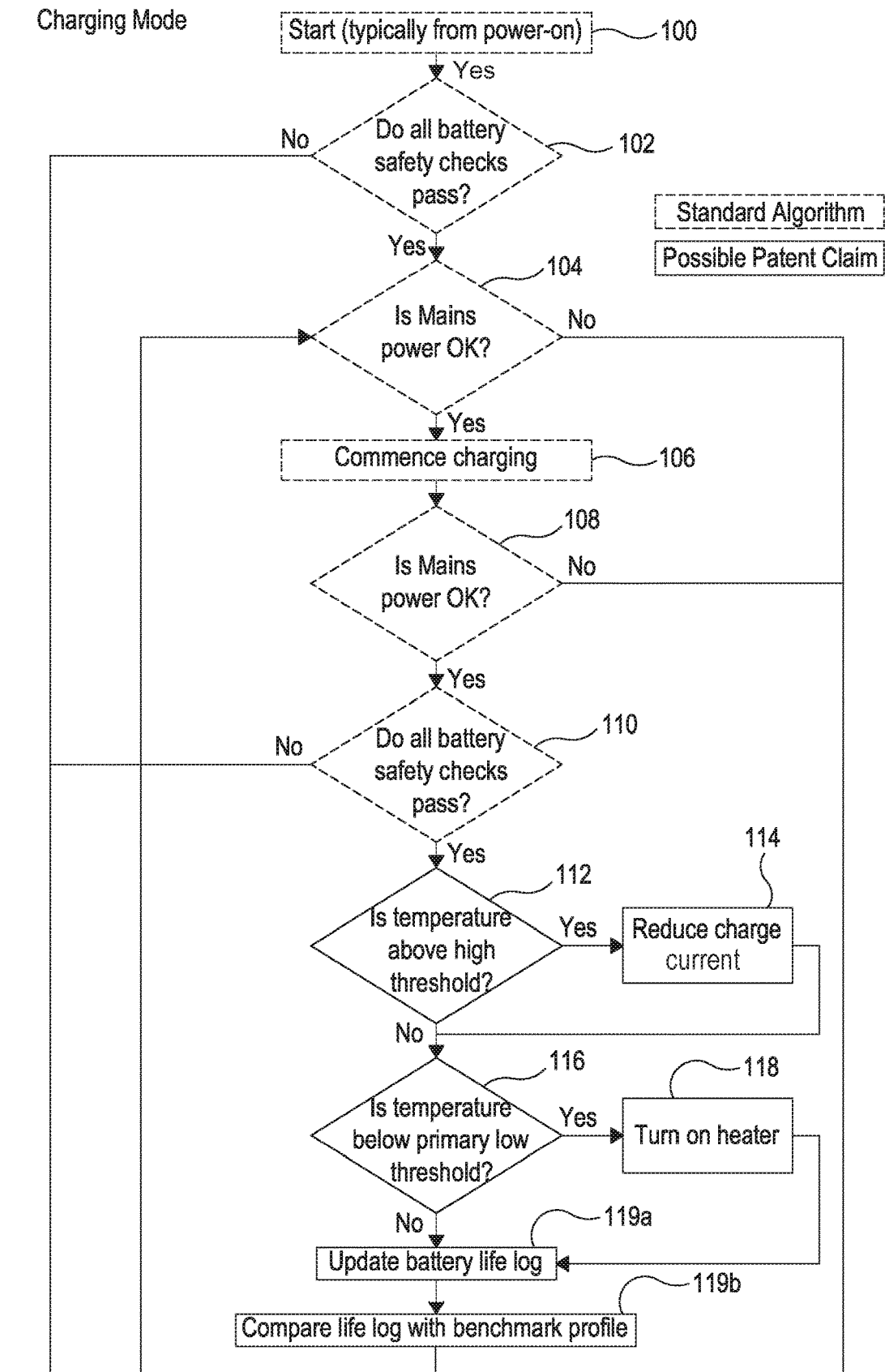
FIG. 3 is a schematic flow diagram illustrating a method of battery management according to an exemplary embodiment of the present invention.
Figure 3:
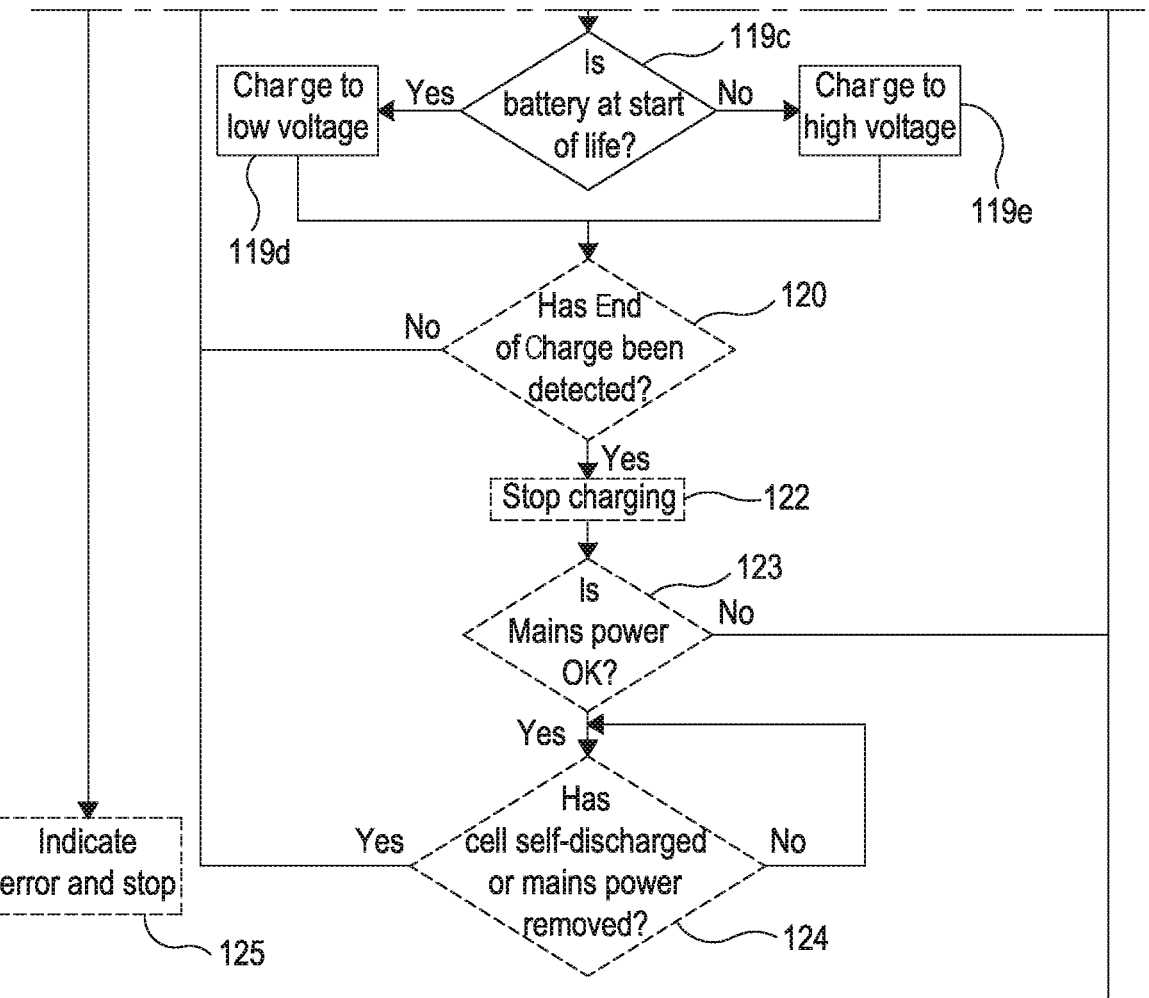
Figure 3:
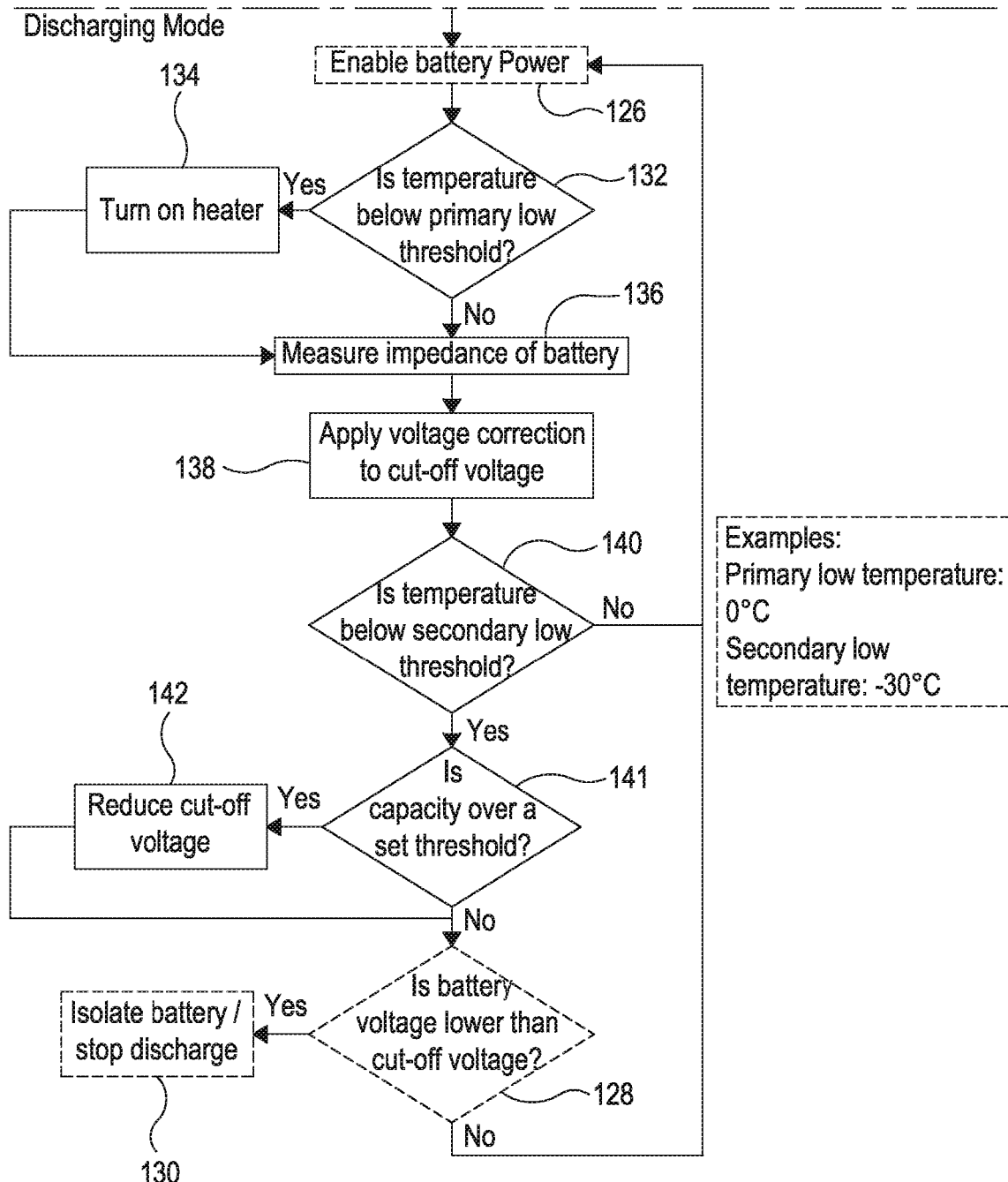

Referring now to FIG. 3 of the drawings, a battery management (or control) module, and method of battery management, according to an exemplary embodiment of the present invention will now be described in more detail in relation to the illustrated flow diagram. The battery management flow diagram starts at step 100, wherein the subsequent charging process flow is typically (although not essentially) triggered when the module is powered on or after the battery pack has been in an idle state.

Once the process flow has started, the actuator control module checks the status (at step 102) of the battery pack for the following parameters:
Charge level
Temperature
Faults
   Under voltage
   Over voltage
   Over temperature
Cell status and/or service/maintenance requirements The actuator control module selects an Event and Action of operation based on the current status of the mains power level, as well as whether or not the battery pack is safe to use, whether or not the actuator is safe to run and whether the battery pack requires charging. Thus, at step 104, the actuator control module checks whether or not the mains power connected to the valve actuator is valid (i.e. sufficient to drive the motor, run the peripheral functions of the valve actuator and charge the battery pack (if required)).

If (or while) it is determined that the mains power present is valid, the battery is safe to use and is fully charged, and the actuator is safe to run, the valve actuator may operate as a conventional motor-driven valve actuator, defined herein as 'Normal' events of operation, powered by the mains power present, and with the battery pack in an idle state (and configured to provide the required valve Shutdown operation in the event of a respective command, power loss, actuator fault, etc).

If it is determined that the mains power present is not valid (i.e. not present or below a defined level), and/or a valid Shutdown command is received, but the battery is safe to use, the actuator is safe to run and there is sufficient charge in the battery pack, the actuator control module will cause a Battery Shutdown event. In this mode, the actuator moves to a predefined position or limit under battery power either immediately or after a configurable waiting time.

If it is determined that the mains power present is valid (i.e. present and above a defined level) and a valid shutdown command is received and the actuator is so configured the actuator control module will cause a Mains Shutdown event. In this mode the actuator moved to a predefined position or limit under mains power, with the battery acting as a standby (if mains power is deemed to be invalid this can cause an automatic Battery Shutdown event), either immediately or after a preconfigured waiting time.

In more detail, and in accordance with an exemplary embodiment, in a Battery Shutdown event, the valve actuator will, under power received from the battery pack:

Move from any position to fully open limit, stopping on either load (i.e. torque and/or thrust) limit or position Move from any position to fully closed limit stopping on either load limit or position Move from any position to any other mid position.

When valid mains power is resumed, the actuator will re-enter normal operation (be this normal, Battery Actuation or Self Contained), provided (or when) the battery pack is sufficiently charged to allow one Shutdown operation.

If at step 104, it is determined that the mains power is valid (and, at step 102, it is determined that the battery is safe to use but requires charging), the actuator control module will, at step 106, commence charging of the battery pack. Within the battery charging process flow loop, the actuator control module once again checks the mains power (at step 108) and also checks (again) whether or not all of the battery safety checks pass (at step 110). If, the mains power remains normal and the battery safety checks all pass, the battery pack charging process flow moves to step 112. At step 112, the actuator control module receives (from a temperature sensor) data representative of the temperature of the battery cells. It then compares the sensed temperature against a predetermined 'high' threshold. If, compared to the predetermined 'high' threshold, the battery pack temperature is determined to be too high, the actuator control module reduces the charge current to the battery pack (at step 114). This part of the process is iterative, and may be repeated in steps, until the battery pack temperature is determined to be below the 'high' threshold (and/or within a predetermined range). Next, at step 116, the actuator control module compares the current battery pack temperature against a predetermined 'primary low' threshold. If, compared to the predetermined 'primary low' threshold, the battery pack temperature is determined to be too low, the actuator control module is configured to switch on the battery pack heater (at step 118). Once again, this part of the process flow may be iterative, and repeated until the battery pack temperature is determined to be within the temperature range defined between the 'high' threshold and the 'primary low' threshold.

In accordance with an exemplary embodiment of the invention, the charging regime may be adapted according to the age/degree of degradation of the battery pack. Thus, at step 119a, a battery life log is periodically updated. At step 119b, the control module compares the life log against a predetermined benchmark profile. If, at step 119c, it is determined that the battery pack is near the start of its lifespan, it is caused to charge at a predetermined 'low voltage' (step 119d), whereas if it is determined not to be near the start of its lifespan, it is caused to charge at a predetermined 'high voltage' (step 119e).

The charging and temperature detection/management process described above is repeated and continued until an End of Charge signal is detected from the charging circuit (at step 120). At that point, the actuator control module is configured to stop the battery pack from charging (at step 122) and check, once again (at step 123), if the mains power is 'normal'. The process flow also checks (at step 124) whether or not the battery pack has self-discharged (or if mains power has been removed) and, if so, the process flow returns to step 104.

Thus, to summarise, once the status of the battery pack has been checked (at step 102), if there are no faults on the battery pack (i.e. the battery pack is safe to use), the actuator control module will then decide the next step dependent on the requirement (determined by the current mode of operation). In the case that the requirement is to charge the battery pack, the actuator control module will switch in a constant current/constant voltage source to charge the battery pack as required. The voltage charge level is determined and controlled by the age of the battery cells, the current level is determined by temperature and a user-set charge power.

Any faults detected within the battery pack can be reported to the user (step 125) via the actuator display or the actuator's own status relays or a network system (wired and/or wireless) connected to the actuator. In addition, the actuator control module can decide whether or not to continue to operate based on the above-mentioned sensed parameters and a pre-set user configuration.

During battery charging, and thereafter, the actuator will operate normally, without reference to the battery pack; unless:

a) the battery reports a critical fault (in which case, the actuator control module exits the charging process flow and generates an error signal to be reported/displayed); or b) valid mains power is removed, a valid shutdown command is received and mains power is removed; or a valid shutdown command is received; mains power is present and the actuator is configured to move on battery in preference (in which case, the actuator control module will enter the Shutdown mode of operation described above).

During charging, the battery management function of the actuator control module will monitor if the battery is safe to use and if the actuator is safe to run. If either of these checks fails, an error status will be flagged. The actuator control module also monitors if valid mains power is lost and/or if a valid shutdown command is received and, if either of these conditions is met, the actuator control module enters the Shutdown mode described above.

Finally, charging will end when the battery reaches a predefined current limit at a predefined voltage level (causing an End of Charge signal to be generated). The predefined voltage level can be varied depending on the age of the battery and ambient temperature. At this point, the battery management function checks the settled battery voltage and if this is within the predetermined range, the battery pack will enter the above-mentioned idle state until it is determined that it requires charging. If the criteria is not met, the battery management function returns to step 106 and resumes the charging process.

Charging will end, as before, when the battery pack reaches a predefined voltage limit, which can be varied depending on the age of the battery. As before, at this point, the battery management function checks the settled battery voltage If this meets predetermined criteria, the battery pack will enter the above-mentioned idle state until it is determined that it requires charging. If the criteria is not met, the battery management function returns to step 106 and resumes the charging process.

Whenever the battery pack is enabled (at step 126), either in a Battery Shutdown event or in a Battery Actuation event, the battery management function enters the discharging process flow. In this process flow, the actuator control module once again monitors the battery pack temperature, but in this case only compensates for low temperatures. At step 132, the battery management function checks to determine if the temperature is below the low threshold. If it is, it causes the heater to be turned on (at step 134). Next, at step 136, it determines the cell impedance across the battery pack and adjusts the lower cut off voltage accordingly.

Of course, another significant advantage of the battery pack and associated active battery management process flow is the fact that the battery pack can be operated in a selected one of many operational modes, rather than the single (passive) Failsafe or Shutdown mode provided for in the above-described conventional valve actuators having an integral battery.

In the Shutdown mode, the actuator operates as a 'normal', mains fed electric actuator until the mains power drops below a predetermined threshold and/or a valid shutdown command is received. This may be with or without a configurable time delay between the event and the shutdown action, as described above. The actuator will then make the decision, based on the mains power level and/or nature of the Shutdown command to either commence a Mains shutdown event or a 'Battery Shutdown' event, which has been described previously.

In a Battery Actuation mode, the mains power (whether from the grid or from a renewable energy source) is used to run the peripheral systems of the actuator and charge the battery pack. When the valve is required to be moved, the battery pack discharges to operate the actuator motor and is then re-charged between movements. This will be described further as a 'Battery Actuation' event. If so configured the actuator can further commence a 'Battery Shutdown' event if the mains power drops below a predetermined threshold and/or a valid shutdown command is received. This may be with or without a configurable time delay between the event and the Shutdown action as described above and with or without mains power present.

A Self-Contained mode, described below, is similar in many respects to the Battery Actuation mode, wherein additional hardware is provided to allow direct, optimised, supply from a renewable energy source and allows additional peripheral items, such as sensors, to be connected. Power derived from, typically, a solar panel is used to run the peripheral systems of the actuator and charge the battery pack. When the valve is required to be moved, the battery pack discharges to operate the actuator motor and is then re-charged between movements. This will be described further as a 'Battery Actuation event'. If so configured the actuator can further commence a 'Battery Shutdown' event if the power drops below a predetermined threshold and/or a valid shutdown command is received and/or the battery become discharged to a predetermined level. This may be with or without a configurable time delay between the event and the Shutdown action as described above.

These additional modes of operation will now be described in more detail.

In the Battery Actuation mode, the actuator control module is able to actuate the valve from an electrical supply less powerful than the power required to run the electro-mechanical actuator. The mains power (whether this be from the grid or a renewable energy source) is used to run the peripheral systems and charge the battery pack. When the valve is required to be moved, the battery pack discharges to operate the actuator (at step 126), described herein as a Battery Actuation event. In this mode of operation, a so-called 'Deep Sleep' mode may be utilised (as described below) to maximise the charge going into the battery pack, with an automatic wake up signal being generated when the actuator motor is required to be operated.

If it is determined, at step 128, that the battery pack voltage is lower than a predefined cut-off voltage, the actuator control module isolates the battery (at step 130) and an error is flagged.

To enable a Battery Actuation event, the battery management function in the charging mode, it will use the mains power available to charge the battery pack, and the battery pack is used to move the actuator in all cases. In this case, when the actuator wants to run, the actuator control module checks if:

a) There is sufficient battery charge
b) The actuator has been brought out of deep sleep
c) The battery us safe to use
d) The actuator is safe to run.

If all these conditions are met the actuator will run from any set position to any set position. A valid input will either be a digital signal, analogue level or network command.

If there an error with either the battery or actuator an error is reported (to the user either visually or over a network) and the actuator will decide if is serious enough to prevent operation. If there is insufficient battery charge this will prevent operation until sufficient charge is present.

In order to charge the battery pack, and whilst the battery pack is not being used to move the actuator, the process flow returns to steps 102 and 104. Provided sufficient mains power is present, the battery is safe to use, the actuator is safe to run and the battery requires charge, the actuator control module will commence charging the battery pack (at step 106). During battery charging, and if so configured, the actuator may enter a power saving (or 'Deep Sleep') mode. The battery pack will be charged unless the battery reports a critical fault (in which case, an error status is flagged and the system will not run), valid mains power is removed (in which case, the system may enter an above-described Battery Shutdown event) or a valid move command is received (in which case, the actuator will run from any set position to any set position, as described above). These parameters are monitored throughout the charging process.

It is to be understood that the above-described Battery Actuation mode may be utilised in a mains powered system and/or, indeed, in a system fed from a renewable energy source, e.g. solar, wind, hydro, etc, and the present invention is not necessarily intended to be limited in this regard. Thus, a so-called Self-Contained mode of operation is also envisaged, and this will now be described in more detail.

The Self-Contained mode of operation is very similar to the Battery Actuation mode of operation and the events, Battery Actuation and Battery Shutdown are identical in operation. The key differences are the power source and the ability to make process decisions from a local sensor powered by the actuator and/or communicate information wirelessly back to a control centre for a Move command to be wirelessly sent to the actuator in return.

In the Self-Contained mode of operation, the valve actuator can be powered using an inconsistent power supply derived from, for example, solar panels or wind generators. Power from these devices can be fed directly into the actuator, and can be used instead of a mains power supply in applications where an adequate mains power supply cannot be provided. The actuator control module manages the energy supply and stores energy in the battery pack. The power supply to the actuator runs the peripheral system and charges the battery when there is enough power present, the battery pack then powers the actuator motor and other systems when commanded and/or if there is insufficient power present. As described above, the battery management function can cause the battery to go into a so-called Deep Sleep mode so as to maximise the charge going to the battery waking only on demand. As in all other modes, status can be reported visually, over wires or wirelessly, and in this case; the device may have the ability to be wired directly to third party sensors and process information based on user-set points.

In this exemplary case the power source is solar radiation through $3^{rd}$ party solar panels. The actuator will have the ability to control and optimise, through power point tracking, the output of the solar panels or other sources and feed the resulting electricity supply into the actuator battery pack. The principle benefit of this system is that the Solar panel array does not need to be able to directly drive the actuators motor so will use the battery as an accumulator to drive the motor and bridge the gaps in sunlight caused by darkness or shadow. The method of operation shall be as per Battery Actuation mode.

In terms of functionality, in addition to the conventional hard wired commands and networks a valid signal will be received wirelessly. The actuator may reply with status information back over the same wireless communications. This allows a totally self-contained solution.

The final aspect of this is the attachment of external sensors (e.g. pressure sensor). This allows the actuator to make internal process decisions and vary its own set Ea point either with or without reference to a central control set point. If the process moves outside of set parameters the actuator can send a warning message over the wired or wireless communications to the control.

In the event of a total loss of power, due to, for example, the failure of a solar panel, the actuator will move from any position to a pre-set set safe position and report an alarm either wired or wirelessly in an as described Battery Shutdown event.

It will be appreciated by a person skilled in the art, from the foregoing description, that modifications and variations can be made to the described embodiments without departing from the scope of the invention as defined by the appended claims.

The invention claimed is:

1. A motor-driven actuator device, comprising: an enclosure in which a motor, control module, and a drive is housed, said drive being coupled between said motor and a device being actuated, the device further comprising an input for receiving a renewable or harvested energy power supply and a battery pack housed within said enclosure, said battery pack being electrically connected to selectively drive the motor and being electrically connectable to said renewable or harvested energy power supply for charging, the control module being configured to cause said battery pack to selectively drive said motor and cause an actuator to move; wherein the control module is configured to trigger a battery shutdown event when it is detected that the capacity of the battery pack has dropped to a critical level and the renewable or harvested energy power supply is not at a sufficient level to maintain or re-charge the battery pack capacity.

2. A motor-driven actuator device according to claim 1, further comprising integral ancillary systems within said enclosure.

3. A motor-driven actuator device according to claim 2, wherein the ancillary systems comprise sensors, transducers, or sensors and transducers connected by wireless or wired communication means to a remote location for monitoring process conditions in respect of said device, and reporting data representative thereof.

4. A motor-driven actuator device according to claim 3, wherein said communication means are only enabled when data is required to be transmitted to or from said remote location.

5. A motor-driven actuator device according to claim 2, wherein said renewable or harvested energy power supply is configured to run the ancillary systems of the device.

6. A motor-driven actuator device according to claim 2, wherein said renewable or harvested energy supply charges said battery pack and said battery pack is configured to run said ancillary systems and to selectively drive said motor.

7. A motor-driven actuator device according to claim 1, having at least two modes of operation, a first mode of operation comprising a shutdown mode in which said actuator is caused to move to a predefined position or limit.

8. A motor-driven actuator device according to claim 7, wherein the control module is configured to monitor a status of said renewable or harvested energy power supply and, if said renewable energy power supply is determined to be disconnected, to have failed, the battery is discharged to a threshold, or a combination thereof, cause said actuator to move to said predefined position or limit under power from the battery pack.

9. A motor-driven actuator device according to claim 7, wherein said control module is configured to cause said actuator to move to said predefined position or limit under power from the battery pack in response to receipt of an external shutdown command signal.

10. A motor-driven actuator device according to claim 1, wherein the device further comprises a battery actuation mode of operation, wherein the control module is configured to cause said battery pack to be charged by said renewable energy power supply and cause said actuator to be selectively moved under power from said battery pack.

11. A motor-driven actuator device according to claim 1, wherein said renewable or harvested energy power supply comprises an energy supply selected from solar, wind, hydro, or any combination thereof.

12. A motor-driven actuator device according to claim 1, wherein the control module is configured to monitor a voltage of said battery pack and, if said voltage is determined to be at or below a predetermined cut-off voltage, cause said battery pack to be isolated and prevent further discharge thereof.

13. A motor-driven actuator device according to claim 7, wherein the device further comprises a combination of battery actuation and shutdown modes of operation, wherein the control module is configured to cause said battery pack to be charged by said renewable energy power supply and cause said actuator to be selectively moved under power from said battery pack, and to monitor a status of said renewable energy power supply and, if (a) said renewable energy power supply is determined to be disconnected, to have failed, or to be disconnected and to have failed, (b) the battery is discharged to a threshold, and (c) a combination of (a) and (b) cause said actuator to move to said predefined position or limit under power from the battery pack.

14. A motor-driven actuator device according to claim 1, wherein the control module is configured to receive data representative of a status of said renewable energy power supply, receive data representative of a charge state, status of said battery pack, or to receive data representative of a charge state and status of said battery pack, and cause said battery pack to be charged from said renewable energy power supply when said renewable energy power supply is determined to be present and said battery pack requires charging.

15. A motor-driven actuator device according to claim 14, wherein the device further comprises at least one temperature sensing device associated with said battery pack, the control module being further configured, during charging of the battery pack, to:
   receive, from said at least one temperature sensing device, data representative of a measured temperature associated with said battery pack;
   compare said measured temperature with a first predetermined threshold temperature; and
   if said measured temperature is greater than said first predetermined threshold temperature, cause a charging current delivered from said energy power supply to said battery pack to be reduced until said measured temperature is at or below said first predetermined threshold temperature.

16. A motor-driven actuator device according to claim 15, wherein the device further comprises at least one heating device associated with said battery pack, and wherein said control module is further configured, during charging of said battery pack, to compare said measured temperature with a second predetermined threshold temperature and, if said measured temperature is less than said second predetermined threshold temperature, cause said at least one heating device to be switched on until said measured temperature is at or above said second predetermined threshold temperature.

17. A motor-driven actuator device according to claim 12, wherein the control module is configured, during discharge of the battery pack, to:
   receive, from at least one temperature sensing device, data representative of a measured temperature associated with said battery pack;
   compare said measured temperature with a third predetermined threshold temperature; and
   if said measured temperature is less than the third predetermined threshold temperature, reduce said predetermined cut-off voltage.

18. A motor-driven actuator device according to claim 1, wherein said battery pack comprises a plurality of secondary Lithium, Nickel-metal Hydride or Nickel-Cadmium battery cells, and the device further comprises a balanced charging circuit and a circuit configured to provide over voltage, over current and under voltage protection in respect of said battery cells.

19. A motor-driven actuator device according to claim 1, wherein said battery pack comprises a plurality of secondary lithium or nickel metal hydride or nickel cadmium cells arranged and configured for use in explosion-proof environments.

20. A motor-driven actuator device according to claim 1, wherein said control module is configurable to operate in a plurality of modes, events and actions of operation in addition to a shutdown operation.

21. A motor-driven actuator device according to claim 20, wherein said plurality of modes, events and actions of operation include battery actuation, self contained mode, mains shutdown, battery shutdown and battery actuation events.

22. A motor-driven actuator device according to claim 20, wherein, in a shutdown mode, the control module is configured to move said actuator to any other mid position, any other limit of movement, or any other mid position and any other limit of movement.

23. A motor-driven actuator device according to claim 21, wherein in said battery actuation mode, the control module is configured to cause the renewable or harvested energy supply to operate the ancillary systems of said actuator device, including causing said battery pack to be charged by said renewable or harvested energy supply until it receives a move command and, in response to a said move command, causes said battery pack to cause said actuator to be moved under power from the battery pack, in the form of a battery actuation event, and said battery pack to be discharged.

24. A motor-driven actuator device according to claim 1, wherein said control module is configured to communicate a battery pack charge level, battery pack status, battery pack faults, or battery pack charge level, battery pack status, and battery pack faults to a user either visually remotely, via a wired or wireless network, or visually remotely and via a wired or wireless network, optionally in the form of a data log.

25. A motor-driven actuator device according to claim 1, wherein said actuator is configured to (a) selectively communicate with the control module and other devices and actuators by wired or wireless means, (b) adjust set point, (c) move on commands received over a wired, wireless, or wired and wireless network, and (d) any combination of (a), (b), and (c).

26. A motor-driven actuator device according to claim 1, wherein said actuator is configured to make process decisions based on received data from sensors, transducers, or sensors and transducers, and vary its own setpoint accordingly selectively with or without reference to an external control system in a Self Contained Mode.

27. A motor-driven actuator device according to claim 1, wherein if the renewable or harvested energy supply, or a supplementary mains supply, is deemed to be disconnected or invalid or a valid shutdown command is received, the actuator is configured, if it has sufficient charge, to move said actuator from any position to a pre-set position or limit in a battery shutdown event either:
   a. on loss of valid power supply;
   b. on loss of power supply and valid wired, wireless, or wired and wireless demand;
   c. on receipt of a valid demand be this by wired, wireless, or wired and wireless; or
   d. any of a, b, or c, with a pre-set and configurable delay.

28. A motor-driven actuator device according to claim 1, comprising means to monitor temperature and during charge:
   a. compare said temperature with a high predetermined threshold and a low predetermined threshold;
   b. if said temperature is above the high threshold cause the charging current to be reduced, wherein the charging current is restored to normal level when temperature drops below said high temperature; and
   c. if said temperature is below the low threshold, cause a heating device to be turned on, raising, maintaining, or raising and maintaining the battery at a temperature allowing optimum charge rates.

29. A motor-driven actuator device according to claim 17, comprising means to monitor temperature, and during discharge:
   a. compare said temperature with a first low threshold and low threshold;
   b. if said monitored temperature is below the first low threshold, reduce said predetermined cut-off voltage; and
   c. if said temperature is below the low threshold cause a heating device to be turned on, raising, maintaining, or raising and maintaining the battery at a temperature allowing optimum discharge rates.

30. A motor-driven actuator device according to claim 1, configured to prevent actuator operation in any mode should said battery pack:
   a. determine a fault condition; and
   b. if so configured, determine that charge level is below that able to allow a shutdown event.

31. A motor-driven actuator device according to claim 1, comprising means for managing and optimizing the power within the actuator enclosure, and varying charge rates of the battery pack.

* * * * *